3,179,638
COPOLYMERS PREPARED FROM VINYL ISO-THIOURONIUM SALTS AND COPOLYMERIZABLE MONOETHYLENICALLY UNSATURATED MONOMERS
Victor E. Shashoua, Wilmington, Del., assignor to E. I. du Pont de Nemours and Company, Wilmington, Del., a corporation of Delaware
No Drawing. Filed Nov. 14, 1960, Ser. No. 68,646
6 Claims. (Cl. 260—79.7)

This invention relates to new vinyl monomers and to polymers containing them. More particularly, it relates to monomers and polymers containing a protected cross-linkable group.

Various vinyl polymers have enjoyed success in the fields of textile fibers, films, castings, and coatings. In all of these fields there have been attempts to improve final product properties by the use of cross-linked or cross-linkable polymers. Thus, styrene has been copolymerized with divinylbenzene to obtain products showing a 20° to 30° C. increase in heat distortion temperature. Methyl methacrylate has been copolymerized with various difunctional monomers such as methacrylic anhydride to yield polymers forming castings of improved scratch resistance. Normal methacrylate castings have been surface coated with cross-linked methacrylate resins in order to give them surfaces of improved scratch resistance. Various attempts have been made to produce cross-linked textile fibers, for example, fibers from acrylonitrile polymers with the expectation of improved liveliness, wrinkle resistance, and resistance to deformation under hot, wet conditions. These various attempts have generally met with disadvantages which have prevented their acceptance. Where the heat distortion temperature of a polymer has been increased, this has caused added difficulties in the thermal casting of the polymer. Polymers cross-linked to give improved surface hardness or scratch resistance have been difficult to form. Textile fibers have not been successfully spun from cross-linked polymers, and cross-linkable polymers of satisfactory properties have been difficult to prepare in a form rendering them easily cross-linked in final fiber form.

Methods are known for introducing cross-linkable sites into polymers, e.g., thiol groups which can be subsequently oxidized to disulfide linkages to place the polymer in insoluble cross-linked form. However, in the preparation of such polymers it has been necessary first to prepare a special intermediate polymer and then to treat the intermediate polymer with a suitable reagent to produce the cross-linkable species. By this method it is always required that the polymer be dissolved during the treatment to provide the intermediate polymer and redissolved in a different solvent after treatment with the reagent in order to spin fibers or cast films. Such a method is both time-consuming and expensive.

It is, therefore, an object of this invention to provide a new class of monomers suitable for introducing cross-linkable sites into polymers by a single polymerization step. It is a more particular object of this invention to provide a new class of vinyl monomers suitable for introducing cross-linkable isothiourea groups into vinyl polymers. It is a further object of this invention to provide synthetic addition polymers which are soluble in common solvents for addition polymers but may be cross-linked in any desired form by treatment with a base and an oxidant to provide insoluble, cross-linked, shaped articles. Other objects will appear hereinafter.

The objects of this invention are accomplished in general by the preparation of monomers of the formula

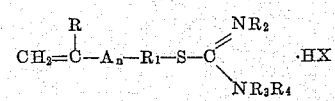

wherein R is selected from the group consisting of hydrogen, alkyl, halogen and nitrile, A is selected from the group consisting of O, S and NH, $n$ is an integer from 0 to 1, $R_1$ is a divalent hydrocarbon radical, $R_2$, $R_3$ and $R_4$ are selected from the group consisting of hydrogen, alkyl and aryl, and X is an anion so selected that the pH of an aqueous solution of said compound is less than 7.

As indicated in the foregoing discussion, X may be any ion so selected that the pH of an aqueous solution of the monomer is less than 7, e.g., X may be any halogen, bisulfate, nitrate, or toluene sulfonate, and preferably provides a pH below about 5.5.

The monomers of this invention may be prepared by reacting a thiourea with a vinyl compound, e.g., allyl chloride, vinyl chloromethyl ether, cyano allyl bromide, N-methyl vinylaminoethyl chloride, or other vinyl compounds containing a group reactive with the thiourea. The monomers may be polymerized with one or more copolymerizable ethylenically unsaturated monomers to provide polymers capable of being spun into fibers or cast into the form of films. The polymeric products which have an intrinsic viscosity of from about 0.4 to 2.0 or higher and which are soluble in common solvents for addition polymers such as acrylonitrile and the like may be cross-linked after being cast in film form or extruded into filaments by treatment with a base followed by treatment with an oxidant.

This invention will be more clearly understood by reference to the following examples in which parts are by weight unless otherwise specified. It is to be understood that the examples are illustrative and the scope of the invention is not to be limited thereto.

EXAMPLE I

In a vessel equipped with stirrer, reflux condenser and dropping funnel were placed 1580 parts of methanol and 478 parts of thiourea. The mixture was heated to reflux with stirring and 543 parts of methallyl chloride were slowly added. After the addition was complete, the mixture was refluxed for two hours. The reflux condenser was then replaced with a take-off condenser, and about 950 parts of methanol were distilled from the reaction mixture. The highly concentrated solution was then poured into 4750 parts of acetone and cooled to 20° C. The solid which precipitated out was filtered off and found to melt at 113° to 114° C. This crude methallyl isothiourea hydrochloride was found to be satisfactory for polymerization purposes. When this material was recrystallized from a 90/10 mixture of acetone/methanol using three times as much acetone as the amount of crude product, an over-all 77% yield of pure methallyl isothiourea hydrochloride was obtained. This white crystalline product melted at 115.0° to 115.3° C. Elemental analysis confirmed that the product was methallyl isothiourea hydrochloride as indicated below:

|  | C (percent) | H (percent) | N (percent) | S (percent) | Cl (percent) |
|---|---|---|---|---|---|
| Calculated for $C_5H_{11}N_2SCl$ | 36.04 | 6.61 | 16.82 | 19.22 | 21.32 |
| Found | 36.20 | 6.72 | 16.59 | 19.06 | 21.22 |

A 5% aqueous solution of methallyl isothiourea hydrochloride was found to saponify to an extent of less than 0.01% in one hour when the pH of the solution was 2. When the pH of the solution was raised to 7, the compound decomposed quantitatively in sixty seconds.

EXAMPLE II

Allyl isothiourea hydrochloride was prepared in the same manner described in Example I, except that 459 parts of allyl chloride were used in place of the methallyl chloride of that example. After distillation of methanol from the reaction mixture the product was precipitated by pouring into ethyl ether rather than acetone. It was recrystallized from acetonitrile. The needles of product obtained melted at 89.8° to 90.2° C. The elemental analysis for the pure allyl isothiourea hydrochloride was as follows:

|  | C (percent) | H (percent) | N (percent) | S (percent) | Cl (percent) |
|---|---|---|---|---|---|
| Calculated for $C_4H_9N_2SCl$ | 31.47 | 5.94 | 18.36 | 21.00 | 23.23 |
| Found | 31.83 | 6.04 | 18.12 | 12.20 | 23.12 |

EXAMPLE III

Styryl methyl isothiourea hydrochloride was prepared from chloromethyl styrene and thiourea. Using the general procedure of the previous examples, the styryl methyl isothiourea hydrochloride obtained had a melting point of 154° C. and an elemental analysis as follows:

|  | C (percent) | H (percent) | N (percent) | S (percent) | Cl (percent) |
|---|---|---|---|---|---|
| Calculated for $C_{10}H_{13}N_2SCl$ | 52.51 | 5.69 | 12.25 | 14.00 | 15.53 |
| Found | 52.48 | 5.70 | 12.20 | 14.15 | 15.44 |

EXAMPLE IV

The following ingredients were stirred together in a reaction vessel for three hours at 50° C. under a blanket of nitrogen gas:

| | Parts |
|---|---|
| Water | 3000 |
| Acrylonitrile | 600 |
| Methallyl isothiourea hydrochloride | 31.6 |
| Potassium persulfate | 3.2 |
| Sodium metabisulfite | 3.2 |
| Hydrochloric acid, sufficient to give pH=4.5. | |

The polymer which precipitated from the reaction mixture was filtered off and washed with deionized water which had been acidified to a pH of 4.5 with hydrochloric acid and was then dried at room temperature overnight. The yield of polymer was 63%. The intrinsic viscosity of the polymer as measured in dimethylformamide solution was 1.97. Analysis for sulfur showed it to contain 2.6% of polymerized methallyl isothiourea hydrochloride. This polymer was found to be readily soluble in dimethylformamide when heated to 60° C. A portion of the polymer was boiled for 60 seconds in a sodium bicarbonate solution of pH=8, and was then dried at room temperature. Five parts of this polymer were suspended in 95 parts of dimethylformamide and heated to 60° C. for two hours. The polymer became swollen but did not dissolve. A 50-part portion of this suspension was treated with 0.1 part of mercaptoethanol for five minutes at 60° C. A fluid solution of polymer in dimethylformamide resulted. The polymer was precipitated from this solution by pouring into water. It was filtered from the water and was boiled with 3% aqueous sodium bicarbonate, and was dried at room temperature. The dried polymer was again insoluble in dimethylformamide.

This series of experiments showed that soluble polymers can be prepared by polymerizing a small amount of methallyl isothiourea hydrochloride with another vinyl monomer at low pH. These soluble polymers can be insolubilized by mild treatment with base followed by oxidation such as occurs during drying in the presence of air. That this insolubilization is due to the formation of thiol groups followed by oxidation of these groups to form cross links through the sulfur of the thiol is shown by the resolubilization of the polymer by treatment with an excess of a compound containing the thiol group. Cross-linking can again be brought about by oxidation under mildly basic conditions.

EXAMPLE V

The following ingredients were stirred together in a reaction vessel at 55° C. for one hour under a blanket of nitrogen gas:

| | Parts |
|---|---|
| Water | 4000 |
| Acrylonitrile | 800 |
| Methyl acrylate | 50 |
| Methallyl isothiourea hydrochloride | 150 |
| Hydrogen peroxide | 1.6 |
| Ferrous chloride | 0.8 |
| Hydrochloric acid, sufficient to give pH=2.0. | |

The product which precipitated was filtered off and washed with water acidified to a pH of 2.0 with hydrochloric acid, and was then dried at 80° C. for two hours. The yield of dry polymer obtained was 55%. It had an intrinsic viscosity of 1.7. Analysis of the polymer showed it to contain 86% acrylonitrile, 6% methyl acrylate, and 8% methallyl isothiourea hydrochloride.

A 25% solution of this polymer in dimetholformamide was prepared by stirring at 60° C. and was dry spun to yield fibers containing 30 filaments of 12 denier (1.3 tex.) each. The residual solvent in these fibers was extracted and they were simultaneously stretched to four times their original length by passing them through a series of tanks containing 97° C. water and winding them up at a speed four times the input speed. The resulting fibers were quite white in color. They were allowed to relax 12% during passage over heated rolls, after which they were quite suitable for textile operations. These drawn and relaxed fibers were found to be soluble in dimethylformamide when heated with stirring.

The yarn prepared in this experiment was knitted into a piece of fabric. Half of this fabric was treated for one minute in water heated to 90° C. and acidified to a pH of 3.0. The other half of the fabric was treated in water at 90° C. to which had been added 0.5% triethanolamine. In each case the treatment was for sixty seconds. The fabrics were removed from the separate liquids and allowed to dry. Each piece of fabric was then unraveled and the yarn ends so obtained were placed in boiling water for five minutes. The yarn from the fabric which had been heated in the solution containing base was insoluble in hot dimethylformamide and retained the looped configuration of the knit fabric, showing that the fiber had been cross-linked while in the knitted form. The yarn from the sample of fabric which had been boiled in the acid solution was soluble in hot dimethylformamide and retained none of the loops imparted by knitting because this fiber had been given no opportunity to form cross links.

This experiment showed that polymers containing the iosthiourea group can be processed into fibers and through normal textile operations without destroying this group if acid conditions are maintained whenever the polymer or fiber is in aqueous medium. When the fiber is put into a desired configuration it can be made to maintain that configuration by conversion of the isothiourea groups to thiol groups with base followed by cross-linking of the thiol groups through oxidation.

EXAMPLE VI

A terpolymer of acrylonitrile, methyl acrylate, and methallyl isothiourea hydrochloride was prepared and converted to knit fabric as in the previous example. The fabric was dipped in a solution of triethanolamine as in that example and was then folded and placed in a Hoffman press, where is was pressed for sixty seconds under a steam pressure of ten pounds per square inch. A good crease was formed which did not disappear when the fabric was exposed to atmospheric steam in flat condition. The crease could not be entirely removed by pressing the fabric in the flat condition on the Hoffman press. When the fabric so pressed was exposed to atmospheric steam without mechanical pressure the crease immediately reappeared. The fabric was then wetted with a 5% aqueous solution of thioglycolic acid brought to the neutral point with triethanolamine. When the wet fabric was pressed in flat condition on the Hoffman press as before the crease was totally removed. It did not reappear on exposure to steam. When this fabric was again dipped in the solution of triethanolamine, was folded, and was again pressed on the Hoffman press, a new crease developed which was as stable as the first had been.

EXAMPLE VII

Using essentially the same method described in Examples I and II, additional isothiourea monomers were made from a variety of starting materials. The starting materials and monomers prepared will be found in Table 1.

*Table 1*

| Starting materials | Monomer | Formula |
| --- | --- | --- |
| Vinyl chloromethyl ether, N,N'-dimethylthiourea. | Vinyloxymethyl N,N'-dimethylisothiourea hydrochloride. | $CH_2=CH-OCH_2-S-C\begin{smallmatrix}NCH_3\\ \\NCH_3\\|\\H\end{smallmatrix}$ ·HCl |
| Cyanoallyl bromide, trimethylthiourea. | Cyanoallyl trimethylisothiourea hydrobromide. | $CH_2=\underset{\underset{CN}{|}}{C}-CH_2-S-C\begin{smallmatrix}NCH_3\\ \\N(CH_3)_2\end{smallmatrix}$ ·HBr |
| Ethylallyl bromide, thiourea. | Ethylallyl isothiourea hydrobromide. | $CH_2=\underset{\underset{C_2H_5}{|}}{C}-CH_2-S-C\begin{smallmatrix}NH\\ \\NH_2\end{smallmatrix}$ ·HBr |
| N-methyl vinylaminoethyl chloride, N-ethylthiourea. | N-methyl vinylaminoethyl N'-ethylisothiourea hydrochloride. | $CH_2=CH=\underset{\underset{CH_3}{|}}{N}-CH_2CH_2-S-C\begin{smallmatrix}NH\\ \\NHC_2H_5\end{smallmatrix}$ ·HCl |
| 2,4-dichlorobutene-1, thiourea. | S-2-chlorobutene isothiourea hydrochloride. | $CH_2=\underset{\underset{Cl}{|}}{C}-CH_2CH_2-S-C\begin{smallmatrix}NH\\ \\NH_2\end{smallmatrix}$ ·HCl |
| 2-bromoethyl vinyl sulfide, thiourea. | Vinylthioethyl isothiourea hydrobromide. | $CH_2=CH-S-CH_2CH_2-S-C\begin{smallmatrix}NH\\ \\NH_2\end{smallmatrix}$ ·HBr |
| Allyl chloride, iodophenol, thiourea. | Allylphenoxy isothiourea hydroiodide. | $CH_2=CH-CH_2-O-\langle C_6H_4\rangle-S-C\begin{smallmatrix}NH\\ \\NH_2\end{smallmatrix}$ ·HI |
| 4-bromo-2-methylstyrene, thiourea. | 2-methylstyryl isothiourea hydrobromide. | $CH_2=CH-\langle C_6H_3(CH_3)\rangle-S-C\begin{smallmatrix}NH\\ \\NH_2\end{smallmatrix}$ ·HBr |
| Methallyl chloride, N-phenyl, N'-dimethylthiourea. | S-methallyl-N-phenyl, N'-dimethylisothiourea hydrochloride. | $CH_2=\underset{\underset{CH_3}{|}}{C}-CH_2-S-C\begin{smallmatrix}NC_6H_5\\ \\N(CH_3)_2\end{smallmatrix}$ ·HCl |
| Allyl chloride, N-phenyl thiourea. | S-allyl-N-phenyl isothiouruea hydrochloride. | $CH_2=CH-CH_2-S-C\begin{smallmatrix}NH\\ \\N-C_6H_5\\|\\H\end{smallmatrix}$ ·HCl |
| 2-bromoethyl vinyl ether, N-diphenyl thiourea. | S-vinyloxyethyl, N-diphenylisothiourea hydrobromide. | $CH_2=CH-O-CH_2CH_2-S-C\begin{smallmatrix}NH\\ \\N(C_6H_5)_2\end{smallmatrix}$ ·HBr |
| Methallyl bromide, N-phenyl-N-ethyl thiourea. | S-methallyl N-phenyl-N-ethyl isothiourea hydrobromide. | $CH_2=\underset{\underset{CH_3}{|}}{C}-CH_2-S-C\begin{smallmatrix}NH\\ \\N-C_6H_5\\|\\C_2H_5\end{smallmatrix}$ ·HBr |

All of these monomers were found to be stable in acidic aqueous medium and to hydrolyze rapidly in basic aqueous medium.

Each of these monomers and the monomers of Examples II and III were copolymerized with acrylonitrile according to the procedure of Example V. A ratio of 90 parts acrylonitrile to 10 parts of isothiourea monomer was used in each case. Table 2 shows the ratio of the monomers present in the polymers which formed.

Table 3

| AN (grams) | Comonomer (grams) | H$_2$O (ml.) | pH | K$_2$S$_2$O$_8$ (grams) | NaHSO$_3$ (grams) | Temp. (° C.) | Time (hrs.) | Yield (percent) | [η] DMF |
|---|---|---|---|---|---|---|---|---|---|
| 42 | 2.5 MATC | 600 | 2.0 | 0.3 | 0.16 | 52 | 16 | 34 | 1.20 |
| 21 | 1.5 MATC | 300 | 3.0 | 0.3 | 0.16 | 40 | 16 | 20 | 0.75 |
| 21 | 1.8 MATC | 300 | 4.0 | 0.3 | 0.16 | 40 | 18.5 | 30.6 | 0.48 |
| 21 | 1.8 MATC | 300 | 5.6 | 0.3 | 0.16 | 40 | 18.5 | 35.1 | 0.54 |
| 21 | 1.8 MATC | 300 | 6.3 | 0.3 | 0.16 | 40 | 18.5 | 24.2 | 0.43 |
| 26 | 1.5 MATA |  | 2.0 | 0.5 | 0.5 | 40 | 16 | 73 | 0.39 |
| 42 | 2.2 MATA | 600 |  | (¹) | ² 0.5 | 40 | 16 | 52 | 0.52 |

¹ 2 ml. at 30% H$_2$O$_2$.
² Thiourea.

Table 2

| Monomers | Feed ratio | Ratio in polymer |
|---|---|---|
| Acrylonitrile/allylisothiourea hydrochloride | 90/10 | 96/4 |
| Acrylonitrile/styrylmethyl isothiourea hydrochloride | 90/10 | 89/11 |
| Acrylonitrile/vinyloxymethyl N,N'-dimethylisothiourea hydrochloride | 90/10 | 93/7 |
| Acrylonitrile/cyanoallyl trimethylisothiourea hydrobromide | 90/10 | 92/8 |
| Acrylonitrile/ethylallyl isothiourea hydrobromide | 90/10 | 96/4 |
| Acrylonitrile/N-methyl vinylaminoethyl N-ethyl-isothiourea hydrochloride | 90/10 | 94/6 |
| Acrylonitrile/S-2-chlorobutene isothiourea hydrochloride | 95/5 | 97/3 |
| Acrylonitrile/vinyl thioethyl isothiourea hydrobromide | 90/10 | 94/6 |
| Acrylonitrile/allylphenoxy isothiourea hydroiodide | 90/10 | 98/2 |
| Acrylonitrile/2-methylstyryl isothiourea hydrobromide | 90/10 | 89/11 |
| Acrylonitrile/S-methallyl-N-phenyl-N',N-dimethylisothiourea hydrochloride | 90/10 | 94/6 |
| Acrylonitrile/S-allyl-N-phenyl isothiourea hydrochloride | 90/10 | 96/4 |
| Acrylonitrile/S-vinyloxyethyl N,N-diphenyl isothiourea hydrobromide | 90/10 | 94/6 |
| Acrylonitrile/S-methallyl N-phenyl-N-ethyl isothiourea hydrobromide | 90/10 | 95/5 |

Each of the copolymers was dissolved in dimethylformamide at 60° C. to form a 5% solution. These solutions were quite fluid and formed without difficulty. A sample of each polymer was boiled for three minutes in aqueous sodium bicarbonate solution of pH 8.0 and was then filtered and dried at 80° C. When heated in dimethylformamide after this treatment, each of the polymers indicated swelling and formed highly viscous mixtures but did not dissolve.

EXAMPLE VIII

A copolymer of styryl methyl isothiourea hydrochloride with styrene was made using a conventional thermal initiation system. Into a stirred reaction vessel were placed 100 parts of distilled styrene and five parts of styryl methyl isothiourea hydrochloride plus 20 parts of methanol. The materials were blanketed with nitrogen and heated under slight pressure at 80° C. for two hours. Isolation of the copolymer by pouring it into methanol, a solvent for unreacted monomers, yielded a white flocculent polymer. This polymer contained sulfur and was soluble in the solvents commonly used for dissolving polystyrene. Films cast from solution or pressed with heating at 120° to 180° C. were made insoluble in these solvents by treating with mildly alkaline oxidant such as hot, aqueous sodium hypochlorite.

EXAMPLE IX

A solution of 5 parts of N-vinylpyrrolidone, 0.2 part of methallyl isothiourea hydrochloride, and 0.04 part of alpha,alpha'-azodiisobutyronitrile in 20 parts of dimethylsulfoxide was blanketed with nitrogen and heated at 70° C. for twenty-four hours. The thickened solution obtained was diluted with four volumes of water, which caused no precipitation. The aqueous solution was then brought to a pH of 8.0 by addition of sodium carbonate and was boiled for one minute, which caused precipitation of the polymer.

A homopolymer of N-vinylpyrrolidone prepared in like manner was not insolubilized by similar pH adjustment and boiling.

EXAMPLE X

Acrylonitrile/methallyl isothiourea hydrochloride (AN/MATC) and acrylonitrile/methallyl isothiouronium acetate (AN/MATA) copolymers were prepared following the general procedure described in Example IV, using the reactants and conditions shown in the preceding table.

As illustrated by the above examples, a number of monomers can be prepared which exhibit the desirable property of being readily polymerizable with other vinyl monomers to produce polymers which can be processed to useful articles and can be treated in final form to bring about a cross-linking reaction which enhances the desirable properties of the article. The monomers must contain an ethylenically unsaturated group capable of vinyl or addition polymerization and an isothiourea group, these two groups being connected by a linkage which will not undergo hydrolytic cleavage under the conditions necessary to convert the isothiourea group to a thiol group. The monomer must, of course, also be resistant to cleavage under conditions of polymerization. The conversion of the isothiourea derivative to the thiol derivative is generally accomplished at a pH between 7 and 10. For this reason, the polymerization is generally carried out at pH below 7 and preferably as low as 2. For this reason, the monomer should have the ethylenically unsaturated group and the isothiourea group united through a linkage which does not readily break at a pH between 2 and 10 in aqueous medium. The simplest such monomers from the standpoint of ease of preparation and utility are allylisothiourea salts and methallylisothiourea salts. These compounds have only carbon atoms between the unsaturated group and the isothiourea group. Monomers in which longer hydrocarbon linkages, e.g., two to eight carbon atoms are present in the chain, are also readily prepared and are quite useful. The linkage between the unsaturated group and the isothiourea group may contain other atoms in addition to carbon, as, for example, oxygen, sulfur, or nitrogen.

The monomers of interest are readily made from compounds containing an unsaturated polymerizable group and a reactive halogen group. When reacted with thiourea or a substituted thiourea, the thiourea reacts in the tautomeric form in which a hydrogen atom is attached to the sulfur atom. For this reason, the thiourea may contain up to three alkyl substituents but must contain at least one hydrogen substituent. Thus, thiourea, N-alkyl thioureas, N.N-dialkyl thioureas, N.N'-dialkyl thioureas, and N,N,N'-trialkyl thioureas may be used. These alkyl substituents may be the same or different.

The unsaturated compound which is reacted with the thiourea may contain other groups in addition to the unsaturated group and the halogen or other group which reacts with the thiourea. For example, the non-terminal carbon atom of the unsaturated linkage may contain an alkyl group having from 1 to 4 carbon atoms. It may likewise contain any halogen atom, particularly chlorine or bromine. It may also contain a nitrile group. The choice of the two reactants used to form a monomeric molecule will depend to a large degee on the monomers with which these isothiourea monomers are to be copolymerized. For polymerization with aromatic monomers such as styrene an isothiourea monomer containing the styrene group will most generally be preferred. Aliphatic isothiourea monomers will generally be used for polymerization with other aliphatic species.

The isothiourea monomer is generally obtained in the form of the salt whose anion was the atom removed during the monomer-forming reaction. Thus, when a chloro compound is reacted with thiourea, the product is obtained in the form of the hydrochloride salt. By anion interchange processes the anion formed during the monomer preparation may be replaced with a nitrate ion, a bisulfate ion, a toluene sulfonate ion, etc. Such changes may be desired in order to alter the reactivity of the monomer in polymerization reactions.

As indicated earlier, the polymerization of the isothiourea-containing monomer with other monomers should be carried out in an acidic medium. Reaction media of pH below 4.5 are preferred and the pH range of $2.0 \pm 0.2$ has been found to be particularly desirable in most cases. Redox polymerization catalysts are preferred, and the combination of hydrogen peroxide and ferrous ion has been found to be particularly desirable. Both batch and continuous polymerization processes are suitable for the preparation of the polymers containing the isothiourea monomers.

The amount of isothiourea-containing monomer incorporated into a polymer molecule will depend on the end use. It is generally sufficient to have between about 1% and about 8% of such monomer in the polymer molecule, though in some cases as much as about 10% or 25% may be desired.

In most instances, it is preferred to isolate the polymer from the polymerization medium with the isothiourea group kept intact. In some cases, it may be preferred to convert this group to the thiol group during the isolation process or before the polymer is given any further processing. In most cases, the polymer will be processed to some shaped article before the conversion of the isothiourea group to the thiol group. This conversion is brought about by treatment with base regardless of the status of the polymer when the conversion is to be made. The base used is not normally critical. It is only important that the aqueous medium of pH above 7 be brought to intimate contact with the individual polymer molecules. In addition to common inorganic bases such as sodium hydroxide, sodium carbonate, sodium bicarbonate, etc., various organic amines such as triethylamine, trimethylamine, etc., are useful. Even aqueous solutions of typical soaps such as sodium stearate may be used successfully. It is sometimes desirable to include in the basic aqueous solution a softening agent specific to the polymeric species being treated in order to aid penetration of this liquid into the polymeric product.

Once the thiol group has been formed, its oxidation to form cross links may be carried out readily. In some cases, the oxygen dissolved in the basic treating medium used for thiol formation is sufficient to bring about this oxidation. Solutions of other oxidizing agents such as chlorine, sodium hypochlorite, hydrogen peroxide, or sodium chlorite may be used to advantage. A number of oxidizing agents are described in U.S. Patent 2,418,941.

The monomers and copolymers of the present invention are of particular utility in the preparation of desirable textile fibers. Of greatest interest are those fibers based primarily on acrylonitrile. For best all-around properties, these polymers will contain at least 70% acrylonitrile. In addition to acrylonitrile and the isothiourea monomer, these polymers may contain other vinyl monomers added for the purpose of improving dyeability or other specific properties. Among the comonomers which may be copolymerized with acrylonitrile and one of the isothiourea-containing monomers are styrene, vinyl acetate, vinyl propionate, acrylic and methacrylic acids and their esters such as methyl acrylate, methyl methacrylate, ethyl acrylate, etc.; vinyl halides such as vinyl chloride and vinylidene chloride; sulfonate-containing monomers such as ethylenesulfonic acid, allyl sulfonic acid, methallyl sulfonic acid, and styrenesulfonic acid, and their respective salts, N-vinyl pyrrolidone, 2-vinyl pyridine, methyl vinyl ketone, methyl vinyl ether, and many others. The monomer must, of course, be copolymerizable with acrylonitrile and the isothiourea monomer in acidic medium.

For other purposes, acrylonitrile will not be present in the polymer but the polymer will consist of one or more other vinyl monomers used in conjunction with an isothiourea monomer. The monomers used may be those listed as comonomers in the previous paragraph. The polymerization conditions used must be acidic.

In the case of fibers or films produced from a polymeric species, cross-linking can be readily effected throughout the structure due to the short path which must be followed by the agents used to bring about this cross-linking. Because of this thorough cross-linking, the products are improved not only in surface properties, but also in over-all softening point, structural strength, resistance to deformation under hot-wet conditions, etc.

In cases where the cross-linking is not too severe to prevent penetration by chemical agents, it may be reversed by treatment of the shaped article with a solution containing excess of a compound containing thiol groups. Mercaptoethanol, thioglycolic acid, and salts of thioglycolic acid are particularly useful in this regard. The cross links which have been broken by this process may be reformed by retreatment with base and an oxidant. The reforming may take place after the article has been reshaped, if desired.

As many widely different embodiments of this invention may be made without departing from the spirit and scope thereof, it is to be understood that this invention is not to be limited to the specific embodiments thereof except as defined in the appended claims.

I claim:

1. A synthetic polymer comprised of acrylonitrile and a copolymerizable vinyl monomer having the formula

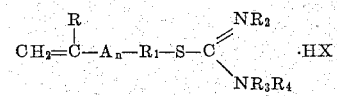

wherein R is selected from the group consisting of hydrogen, alkyl, halogen and nitrile, A is selected from the group consisting of O, S and NH, $n$ is an integer from 0 to 1, $R_1$ is a divalent hydrocarbon radical, $R_2$, $R_3$ and $R_4$ are selected from the group consisting of hydrogen, alkyl and aryl, and X is an anion so selected that the pH of an aqueous solution of said compound is less than 7, said copolymerizable vinyl monomer being present in said polymer in copolymerized form in an amount from 1% to 25%.

2. The polymer of claim 1 wherein said copolymerizable vinyl monomer is an acid salt of allylisothiourea.

3. The polymer of claim 1 wherein said copolymerizable vinyl monomer is an acid salt of styrylmethyl isothiourea.

4. The polymer of claim 1 wherein from 2% to 14% of a copolymerizable monothylenically unsaturated monomer and from 1% to 8% of said vinyl monomer are present in copolymerized form in said polymer.

5. The polymer of claim 4 wherein said monoethylenically unsaturated monomer is methyl acrylate.

6. A synthetic polymer comprised of N-vinyl pyrrolidone and a copolymerizable vinyl monomer having the formula

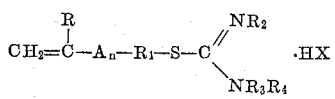

wherein R is selected from the group consisting of hydrogen, alkyl, halogen and nitrile, A is selected from the group consisting of O, S and NH, $n$ is an integer from 0 to 1, $R_1$ is a divalent hydrocarbon radical, $R_2$, $R_3$ and $R_4$ are selected from the group consisting of hydrogen, alkyl and aryl, and X is an anion so selected that the pH of an aqueous solution of said compound is less than 7, said copolymerizable vinyl monomer being present in said polymer in copolymerized form in an amount from 1% to 25%.

References Cited by the Examiner

UNITED STATES PATENTS

| | | | |
|---|---|---|---|
| 2,347,827 | 5/44 | Hunt | 260—79 |
| 2,655,493 | 10/53 | Price | 260—85.5 |
| 2,688,010 | 8/54 | Chaney | 260—79.7 |
| 2,697,727 | 12/54 | Kaiser | 260—551 |
| 2,858,297 | 10/58 | Melamed | 260—79.7 |

FOREIGN PATENTS

| | | |
|---|---|---|
| 843,006 | 8/60 | Great Britain. |
| 1,043,633 | 11/58 | Germany. |

WILLIAM H. SHORT, *Primary Examiner.*

H. N. BURSTEIN, J. R. LIBERMAN, *Examiners.*